May 15, 1928.  
W. SEIZ  
1,670,081  
INDUCTION MOTOR CONTROL SYSTEM  
Filed April 16, 1926
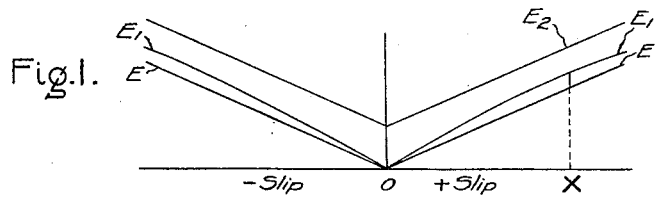
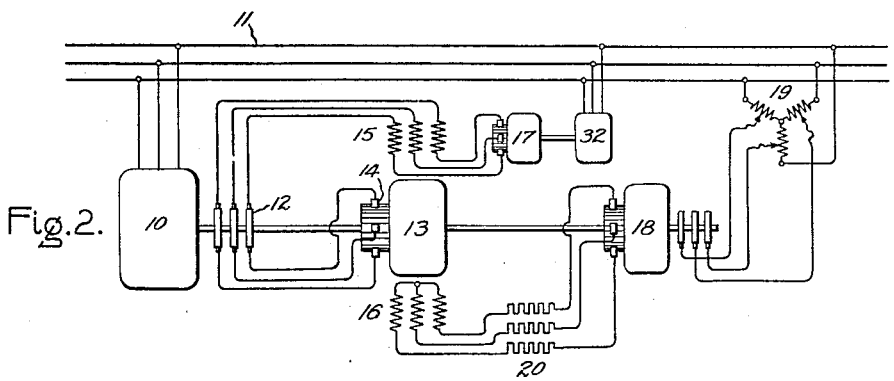
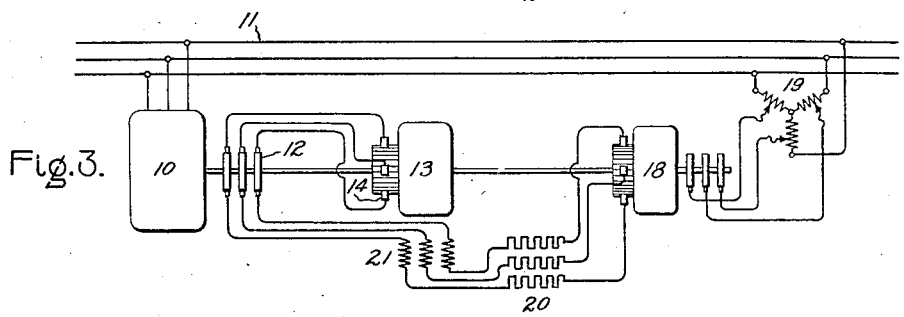
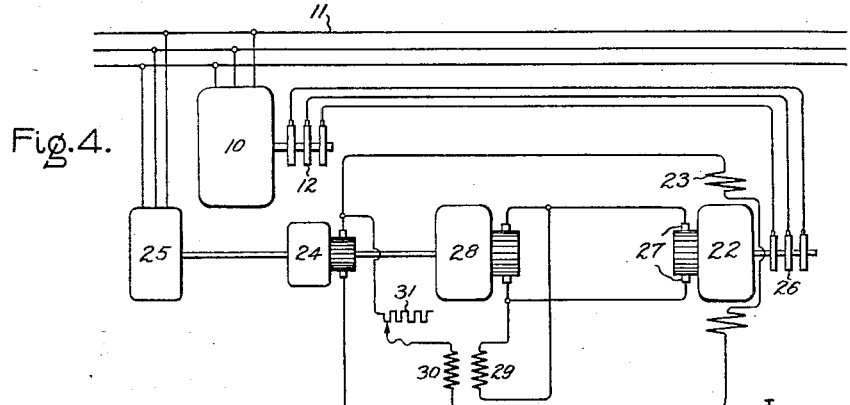
Inventor:  
Walter Seiz,  
by  
His Attorney.

Patented May 15, 1928.

1,670,081

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

INDUCTION-MOTOR-CONTROL SYSTEM.

Application filed April 16, 1926, Serial No. 102,533, and in Germany June 20, 1925.

My invention relates to the control of induction machines and particularly to a control system which will enable the induction machine torque to be controlled independently of speed. The invention is applicable to the operation of the induction machine either as a motor or as a generator but the following description will be confined to the use of the induction machine as a motor.

The features of my invention which are believed to be novel and patentable will be pointed out in the claims appended hereto. For a better understanding of the invention, reference is made in the following description to the accompanying drawing in which Fig. 1 represents curves explanatory of the theory of the invention, and Figs. 2, 3 and 4 represent different arrangements for carrying the invention into effect.

The torque of an induction motor is essentially dependent upon the counter electromotive force developed in its secondary circuit. In a cascade exciting arrangement the counter electromotive force is generated in auxiliary exciter apparatus, generally a commutator machine arranged to produce polyphase exciting currents of the same frequency as that of the slip frequency of the induction machine. The magnitude of the counter electromotive force generated in the exciter and its phase relation is generally adjustable for varying the speed and power factor of the motor. The secondary current of the induction motor is dependent upon the difference in the slip voltage and the voltage generated by the exciter. The secondary voltage of the induction motor varies with the slip and may be represented by the lines E E of Fig. 1 where the abscissa represents + and − slip and the ordinates represent voltage. The counter voltage of the exciter may also be made proportional to the slip and may be represented by the lines E' E' which deviate somewhat from the lines E E at speeds remote from synchronism. Now it will be evident at slip $x$ for example, the secondary current of the induction motor will be proportional to the difference in E and E'. The primary load current is also proportional to the secondary current and consequently the torque of the motor is measured by the difference of E and E' at any slip. At zero slip these voltages are equal and consequently we arrive at the no load speed of the motor when the torque is zero. This theoretical discussion is not quite correct because we have considered the losses of the motor and the no load current to be zero. This assumption simplifies the discussion and is quite immaterial because the discussion relates to the useful output torque of the motor.

If now the exciter apparatus is adjusted so that lines E and E' coincide at all slips, we would have a motor combination incapable of doing any work and without any definite no load speed.

The present invention assumes that we start with this last mentioned arrangement and then add to the excitation voltage another voltage variable at will for controlling the output of the motor. Thus if we add to such excitation voltage a constant voltage corresponding to line $E^2 E^2$ of Fig. 1, we obtain a motor combination having a constant useful torque at all speeds. The torque of course may be varied at any speed by simply varying the magnitude of this additional voltage.

Fig. 2 represents a practicable way of carrying the invention into effect where 10 represents the main induction motor having its primary supplied from the source 11; 12 represents the secondary rotor slip ring terminals of the motor 10; 13 a polyphase commutator exciter for the main motor having its brushes 14 connected to the slip rings 12. The voltage component supplied by exciter 13 which is equal and opposite to and varies with the slip voltage of the induction machine is produced by the field winding 15. In order for the field winding 15 to produce the variable voltage component it must have a current which varies directly with the slip ring voltage. This field winding may be excited, therefore, from the slip rings 12, as shown. This field winding obviously contains inductance and the current from the slip rings 12 is of variable frequency so that provision must be made for eliminating the tendency of this current to decrease with an increase in frequency and vice versa. Ordinarily this is accomplished by placing a high ohmic resistance in the excitation circuit so that the resistance effect predominates over the inductance effect and makes the current substantially independent of frequency changes. This is wasteful and I accomplish the same result in a novel manner by connecting in series with the field 15 a phase advancer represented at 17 preferably driven at constant speed by a motor 32. This phase advancer is designed to eliminate the inductance effect in this excitation circuit so that the excitation is directly proportional to the slip ring voltage and independent of its frequency. Thus, without the field winding 16, we have a combination having no definite no load speed and incapable of any useful output.

To obtain the proper frequency for the excitation of field winding 16, I use a frequency converter 18 supplied by an adjustable voltage transformer 19 from the source 11. To eliminate the inductance effect of the field winding 16 at varying frequencies I provide a high ohmic resistance 20 in this circuit. The current in this circuit is relatively smaller than that in the exciting circuit of field winding 15 so that the high ohmic resistance 20 in the circuit of winding 16 is a practicable expedient. Now the torque of the motor 10 may be varied at any speed by adjusting the voltage of the transformer 19. If this voltage is not adjusted the motor will run at varying speeds at constant torque. The speed at which the motor will run under this condition will of course be dependent on the load so that if the load varies the speed will vary inversely.

Fig. 3 differs from Fig. 2 in that the two field windings of machine 13 have been combined in a single field winding 21 excited in series relation from the slip rings 12 and the frequency converter 18 which must now be designed to carry a larger current. The same result is accomplished because the excitation component furnished from the slip rings 12 varies with the slip voltage and the component furnished by the frequency converter 18 remains constant or varies with the adjustment of the transformer 19.

Fig. 4 represents a further arrangement for carrying out the invention. Here the main induction motor is excited from a synchronous converter 22 the speed and frequency of which is dependent upon the slip frequency of the induction machine. The direct current field windings 23 of machine 22 are excited from a direct current machine 24 driven from a constant speed motor 25. The voltage delivered at the slip rings 26 of the synchronous converter 22 is determined by the direct current voltage supplied to its direct current brushes 27. This voltage is supplied by the direct current machine 28 also driven by the motor 25. The machine 28 has two field windings 29 and 30. Winding 29 is excited from the direct current end of the synchronous converter 27 and winding 30 is excited from the machine 24 through an adjustable rheostat 31. If the field winding 30 were omitted it would be evident that the current in the field winding 29 would vary with the slip voltage of the main induction motor since the voltage ratio at the alternating current and direct current ends of the synchronous converter remains constant. This part of the apparatus may be proportioned to produce the voltage component corresponding to the line E of Fig. 1. Now by the field winding 30 we add to this component a voltage which may be adjustable to supply the torque component voltage corresponding to the line $E^2$ of Fig. 1.

Thus in each of the modifications described the secondary excitation of the induction motor is supplied by a voltage having the two components specified. By excitation voltage, I mean a voltage other than that which is induced into the secondary from the primary of the motor, and by components as herein employed I mean that this secondary excitation voltage is the result of the combination of separately derived excitation voltages corresponding to such components. However, the manner of deriving and combining such components may vary as shown by the three embodiments described.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. The method of supplying the secondary excitation of induction motors which consists in supplying to the secondary windings thereof an excitation voltage made up of two components, one component being substantially equal to the no load secondary voltage of the induction motor at any speed and the other component supplying an additional excitation corresponding to the output torque of the motor.

2. In combination an induction machine together with means for supplying the secondary excitation thereof comprising a dynamo electric machine connected in cascade with the secondary of said induction machine, and means for exciting said dynamo electric machine by two components, one component being substantially proportional to the secondary no load voltage of said induction machine at any speed and the other component being substantially proportional to and determining the output torque of said induction machine.

3. In combination an induction machine together with means for supplying the secondary excitation thereof comprising an exciter connected in cascade with said induction machine, field windings on said exciter, and means for supplying two excitation components to said field windings, one component being substantially proportional to the secondary no load voltage of said induction machine at any speed and the other component being substantially proportional to and determining the output torque of said induction machine.

4. In combination an induction machine, a commutator exciter connected in cascade with said induction machine, a pair of field windings on said exciter, means for supplying to one of said field windings a current derived from the secondary of said induction machine which current is substantially proportional to the secondary no load voltage of said induction machine at any speed, and means for supplying to the other of said field windings a current which determines the output torque of said induction machine.

5. In combination an induction machine, a commutator exciter connected in cascade with said induction machine, field windings on said exciter, said field windings being excited from the secondary of said induction machine, and a phase advancer connected in series relation with said field windings for substantially neutralizing the inductance of said field winding circuit.

6. In an induction machine regulating system, an inductive exciting circuit supplied from a variable frequency source and a phase advancer connected in series relation with said circuit for substantially neutralizing the inductance of said exciting circuit.

7. The method of regulating the torque of induction motor which consists in supplying an excitation to the secondary of such motors made up of two components, one component being substantially equal and opposite to the no load secondary voltage of said induction motor at any speed, and the other component determining the output torque of said motor and adjusting said last mentioned component.

8. In combination an induction machine together with means for supplying the secondary excitation thereof comprising an exciter connected in cascade with said induction machine, field windings on said exciter, means for supplying two excitation components to said field windings, one component being substantially proportional to the no load secondary voltage of said induction machine at any speed, and the other component being substantially proportional to and determining the output torque of said induction machine, and means for varying said last mentioned component to vary the torque of said machine.

In witness whereof, I have hereunto set my hand this 29th day of March, 1926.

WALTER SEIZ.